W. S. NORDEN.
RIM EXPANDING AND CONTRACTING TOOL.
APPLICATION FILED JUNE 1, 1921.
1,428,052.  Patented Sept. 5, 1922.
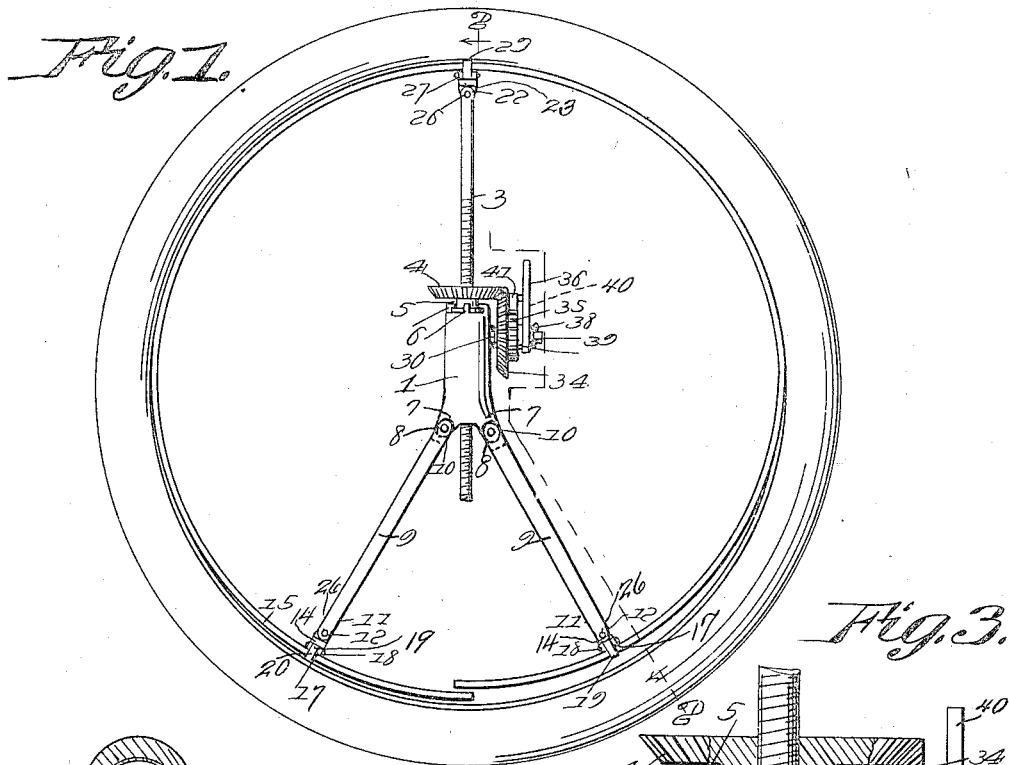
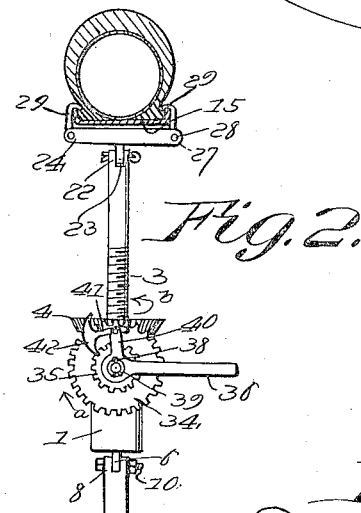
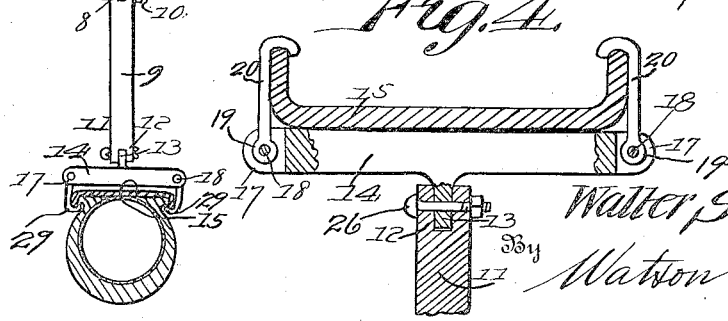
Inventor
Walter S. Norden,
By Watson E. Coleman
Attorney Patented Sept. 5, 1922.

1,428,052

UNITED STATES PATENT OFFICE.

WALTER SANDERS NORDEN, OF BIG ROCK, TENNESSEE.

RIM EXPANDING AND CONTRACTING TOOL.

Application filed June 1, 1921. Serial No. 474,065.

*To all whom it may concern:*

Be it known that I, WALTER S. NORDEN, a citizen of the United States, residing at Big Rock, in the county of Stewart and State of Tennessee, have invented certain new and useful Improvements in Rim Expanding and Contracting Tools, of which the following is a specification, reference being had to the accompanying drawings.

The present invention has for its purpose the provision of a tool particularly adapted for demounting and replacing rims, particularly for retracting the rim, so as to permit the tire to be removed or placed on the rim.

Another purpose consists of a tool of this character for saving considerable labor, trouble, and inconvenience in taking off and placing tires on rims, hence it is the aim to provide a simple and efficient and practical tool, in which improved features of construction are involved, and also provide a tool which can be cheaply made and sold at a reasonable profit.

Still another purpose is the provision of a tool including a body member having legs adapted to be connected to the rim, in combination with an adjustable screw likewise adapted to be connected to the rim, whereby upon rotating the screw the rim may be contracted or expanded from and in contact with the tire, thereby facilitating the removal and placement of the tire in position.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing the improved tool as applied to a rim and constructed in accordance with the invention, showing the rim partly contracted, so that the tire may be removed.

Figure 2 is a sectional view on line 2—2 of Figure 1 through the rim, showing the tire in engagement with the rim, and illustrating the construction of the means for rotating the extensible and retractible screw, and showing the fastening means connecting the screw and the legs.

Figure 3 is a sectional view through the body of the tool more clearly showing the construction of the mechanism for adjusting the extensible and retractible screw.

Figure 4 is a detail view through one of the connections of one of the legs and the rim.

Referring to the drawings, 1 designates the main body of the tool, which is cylindrical and is provided with a longitudinally extending bore 2, through which the adjusting screw 3 passes. Threaded on the screw is a bevel gear 4 which is provided with an annular channel 5. The main cylindrical body of the tool on one end is provided with a plurality of overhanging lugs or arms 6, which extend into the annular channel or groove 5 of the bevel gear, thereby rotatably connecting the gear to the main body. Obviously when the bevel gear 4 is rotated in one direction or the other, the screw 3 is adjusted radially of the rim.

The other end of the cylindrical body merges into a pair of diverging arms 7, which are straddled by the forks 8 of the legs 9, which are disposed in diverging positions relatively to the body. Suitable bolts or pins 10 pass through the forks and the arms 7, and are provided with nuts, so as to pivotally connect the legs to the arms. The ends 11 of the legs also have forks 12, which straddle the lugs 13 of the plates 14, which are adapted to be disposed transversely of the inner surface of the rim 15. The ends of the plates 14 have spaced forks 17 receiving bolts 18, on which the eyes 19 of the hooks 20 are pivotally mounted. The hooks 20 are adapted to engage the flanges of the rim, thereby connecting the plates to the rim, so that when the legs 9 are retracted radially, the legs will pull upon the plates 14, which in turn will pull upon the hooks, and retract the rim. However, before the rim can be retracted, the abutting ends of the rim are first deflected relatively to each other, so that one end may overlap the other, when the rim is retracted. One end of the screw is provided with forks 22, which straddle a lug 23 of the plate 24, which extends across the inner surface of the rim. Suitable bolts 26 pass through the lugs 13 and 23, so as to connect the legs 9 and the screw 3 respectively to the plates 14 and 24. These bolts 26 have nuts to hold them in position, to insure the pivotal connection between the parts. The ends of the plate 24 also have forks 27 for the reception of bolts 28, which are similar to the bolts 18, for pivotally supporting hooks 29, which likewise engage the flanges of the rim. Obviously it will be noted, that when the bevel gear 4 is rotated in one direction or the other, the screw 3 may be extended or retracted, and if retracted, the legs 9 will be retracted radially, hence contracting the rim. If the screw 3 is extended, the legs 9 are likewise extended, thereby expanding the rim. When the rim is contracted, it is obvious that the tire may be easily removed therefrom, and when the rim is expanded, it is forced into engagement with the tire.

Projecting laterally from the cylindrical body of the tool is a socketed projection 30, in which a shaft or pin 31 is secured by means of a cotter key 32. This pin or shaft 31 has a collar 33, to limit the bevel gear 34 in its position upon the shaft 31. The bevel gear 34 meshes with the bevel gear 4, therefore when it is rotated, motion is imparted to the gear 4. The gear 34 has on one face an integral therewith a gear 35, and pivotally mounted upon the shaft or pin 31 is a lever 36 which is engaged between a collar or washer 39 and one face of the gear 35. The cotter pin or key holds the parts on the pin or shaft 31, and holds them in position, so that the gear 34 remains in contact with the collar 33, but not enough to retard its free movement. The lever 36 has a radially extending arm 40, on which a gravity actuated dog 41 is pivotally mounted. This dog 41 has a T-head 42, either end of which is designed to engage the teeth of the gear 35, it depending entirely on the direction of rotation of the gear 34. For instance if the gear 34 is rotated in the direction of the arrow $a$, then the gear 4 will be rotated in the direction of the arrow $b$, hence the screw 3 will be extended radially. The direction indicated by the arrow $a$ is clockwise, therefore if the gear 34 is rotated counter-clockwise by tilting the dog 41 in a reverse position, then the gear 4 will rotate in a direction reverse to that indicated by the arrow $b$, thereby retracting the screw 3, as well as the legs 9, and consequently contracting the rim.

The invention having been set forth, what is claimed as being useful is:

In a rim expanding and contracting tool, a body, means at one end adapted for detachable connection with the separable end portions of the rim, a screw extending rotatably through the body, means at the outer end of the screw adapted for connection with the rim substantially opposite the connections of the first means, a bevel gear axially aligned with the body and rotatably connected to the other end thereof and being threaded to the screw, a stub shaft mounted on the side of the body, a bevel gear on the stub shaft meshing with the first gear, a lever mounted on the stub shaft and having double throw connections with the second bevel gear for rotating it in either direction, whereby the first bevel gear may feed the screw in either direction of the body for expanding and contracting the rim, said stub shaft being detachable from the body, whereby the second bevel gear and its cooperating parts may be detached as a whole from the body.

In testimony whereof I hereunto affix my signature.

WALTER SANDERS NORDEN.